(12) United States Patent
Trisnadi

(10) Patent No.: US 6,323,984 B1
(45) Date of Patent: Nov. 27, 2001

(54) METHOD AND APPARATUS FOR REDUCING LASER SPECKLE

(75) Inventor: Jahja I. Trisnadi, Cupertino, CA (US)

(73) Assignee: Silicon Light Machines, Sunnyvale, CA (US)

(*) Notice: Subject to any disclaimer, the term of this patent is extended or adjusted under 35 U.S.C. 154(b) by 0 days.

(21) Appl. No.: 09/687,465

(22) Filed: Oct. 11, 2000

(51) Int. Cl.[7] .................................................. G02F 1/03
(52) U.S. Cl. ............................ 359/245; 359/242; 359/237
(58) Field of Search ............................. 359/245, 242, 359/243, 244, 240, 241, 239, 238, 237

(56) References Cited

U.S. PATENT DOCUMENTS

| | | | |
|---|---|---|---|
| 3,941,456 | 3/1976 | Schilz et al. ........................ | 350/161 |
| 4,035,068 | 7/1977 | Rawson ............................... | 353/122 |
| 4,143,943 | 3/1979 | Rawson ............................... | 350/120 |
| 5,272,473 | 12/1993 | Thompson et al. ................... | 345/7 |
| 5,313,479 | 5/1994 | Florence .............................. | 372/26 |
| 5,361,131 | * 11/1994 | Takemori et al. .................... | 356/355 |
| 5,534,386 | 7/1996 | Petersen et al. ..................... | 430/320 |
| 5,982,553 | 11/1999 | Bloom et al. ........................ | 359/627 |
| 6,154,259 | 11/2000 | Hargis et al. ........................ | 348/756 |

OTHER PUBLICATIONS

Wang, L. et al., "Speckle Reduction in Laser Projections With Ultrasonic Waves," pp. 1659–1664, Optical Engineering, vol. 39, No. 6, Jun. 2000.

Leith, E. N. et al., "Imagery With Psuedo–Randomly Diffused Coherent Illumination," pp. 2085–2089, Applied Optics, vol. 7, No. 10, Oct. 1968.

Goodman, J.W., "Statistical Properties of Laser Speckle Patterns," in Dainty, J.C. (editor), *Laser Speckle and Related Phenomena*, Topics in Applied Physics, vol. 9, Springer Verlag, New York, 1984.

Goodman, J.W. et al., "Speckle Reduction by a Moving Diffuser in Laser Projection Displays," Silicon Light Machines, Sunnyvale, California, Presented at OSA Annual Meeting 2000, Oct. 23, 2000.

Hedayat, A.S. et al., *Orthogonal Arrays, Theory and Applications*, Springer–Verlag, Chapter 7, New York, 1999.

"Combining the Effects of a Moving Diffuser and Temporal Averaging," Sep. 3, 1998.

Goodman, J. W., "Some Fundamental Properties of Speckle," vol. 66, No. 11, pp. 1145–1149, Stanford University, Nov. 1976.

Wang, L. et al., "Speckle Reduction in Laser Projection Systems by Diffractive Optical Elements," pp. 1770–1775, Applied Optics vol. 37, No. 10, Apr. 1998.

* cited by examiner

*Primary Examiner*—Hung Xuan Dang
(74) *Attorney, Agent, or Firm*—Haverstock & Owens LLP (57) ABSTRACT

A method and apparatus for reducing laser speckle in a laser illuminated system where a line illumination produced by a laser is scanned across a diffuse service is preferably incorporated in a display apparatus where a two dimensional image is produced on a display screen. The display apparatus includes a light modulator, a wavefront modulator, and a projection/scanning optical arrangement. The light modulator modulates a laser illumination to form a line image made up of a linear array of pixels. The wavefront modulator varies a spatial phase across a width of the line image thus forming a phase modulated wavefront. The projection/scanning optical arrangement projects the line image onto the display screen and scans the line image over the display screen. The phase modulated wavefront produces multiple speckle patterns that are averaged as the line image is scanned and, thus, produces the reduced laser speckle.

22 Claims, 8 Drawing Sheets

| FIG. 5A | FIG. 5B |

METHOD AND APPARATUS FOR REDUCING LASER SPECKLE

FIELD OF THE INVENTION

The present invention relates to the field of laser illuminated systems. More particularly, the present invention relates to the field of laser illuminated systems in which a line illumination produced by a laser is scanned over a diffuse surface.

BACKGROUND OF THE INVENTION

Coherent light illuminating a rough surface produces speckle. Reflection from the rough surface is referred to as diffuse reflection. Transmission through the rough surface is referred to as diffuse transmission. In the diffuse reflection or the diffuse transmission, light scatters in various directions. The coherent light scattered by the diffuse reflection or by the diffuse transmission forms an interference pattern in the space away from the rough surface. If viewed by a human eye, the eye will see dark and light in a 'granular' pattern. The granular pattern is the speckle. An intensity detector of an optical system will also detect the speckle if the optical system views the rough surface illuminated by the coherent light.

Figure 1:
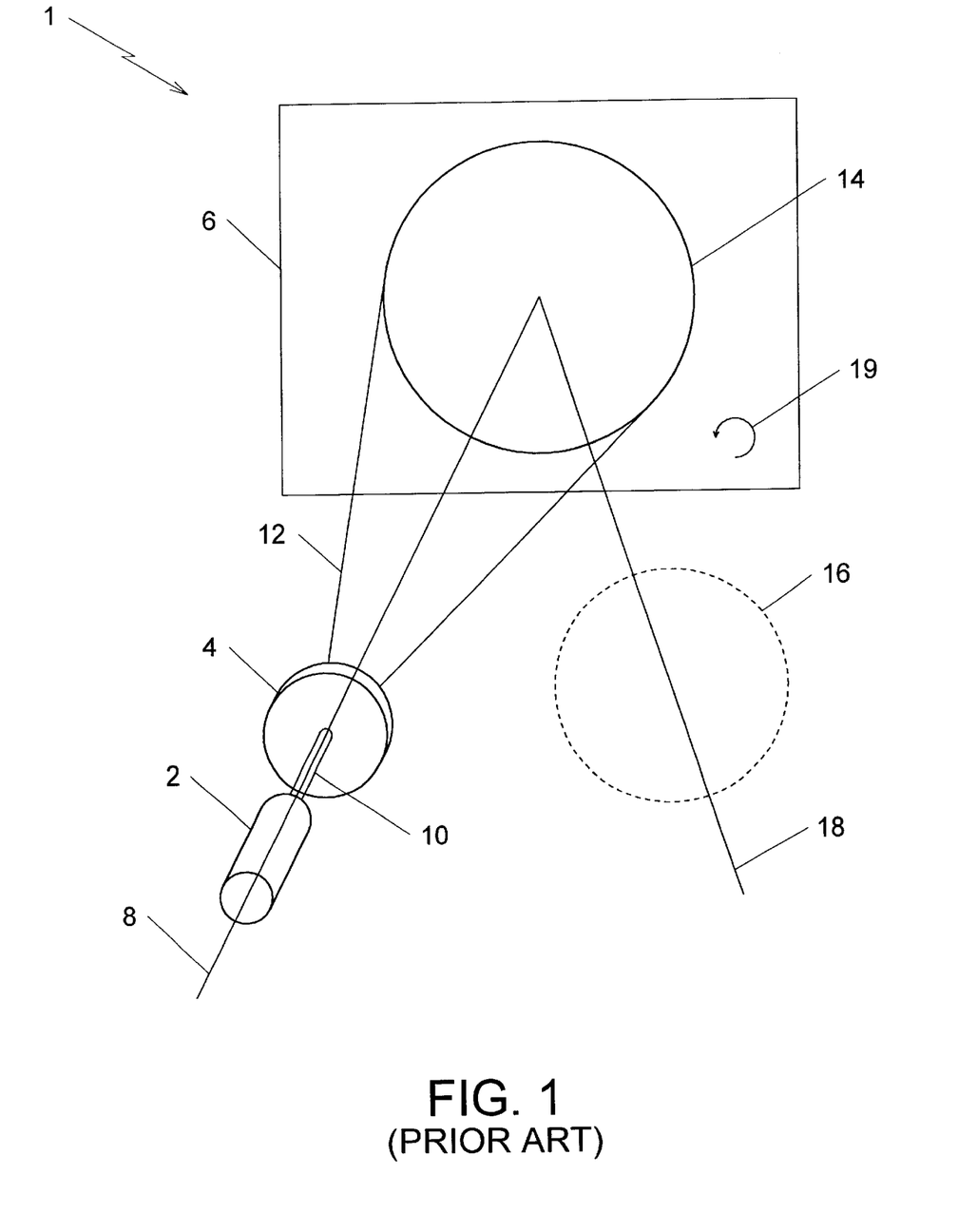
FIG. 1 illustrates an apparatus for demonstrating laser speckle of the prior art.

A speckle demonstration apparatus of the prior art is illustrated in FIG. 1. The speckle demonstration apparatus 1 includes a demonstration laser 2, a diverging lens 4, and a viewing screen 6, which are located on a first optic axis 8. The demonstration laser 2 emits a laser beam 10. The diverging lens 4 transforms the laser beam 10 into a divergent laser beam 12. The divergent laser beam 12 illuminates the viewing screen 6 in a large area 14. The viewing screen 6 diffusely reflects the divergent laser beam 12 creating an interference pattern. An observation plane 16 located on a second optic axis 18 intersects the interference pattern. The observation plane 16 is the field-of-view in space where the eye or the optical system is focused. If the eye or the optical system is focused at the viewing screen 6, the observation plane 16 is located at the viewing screen 6. Note that the diverging lens 4 aids in demonstrating the speckle but is not necessary to produce the speckle.

Figure 2:
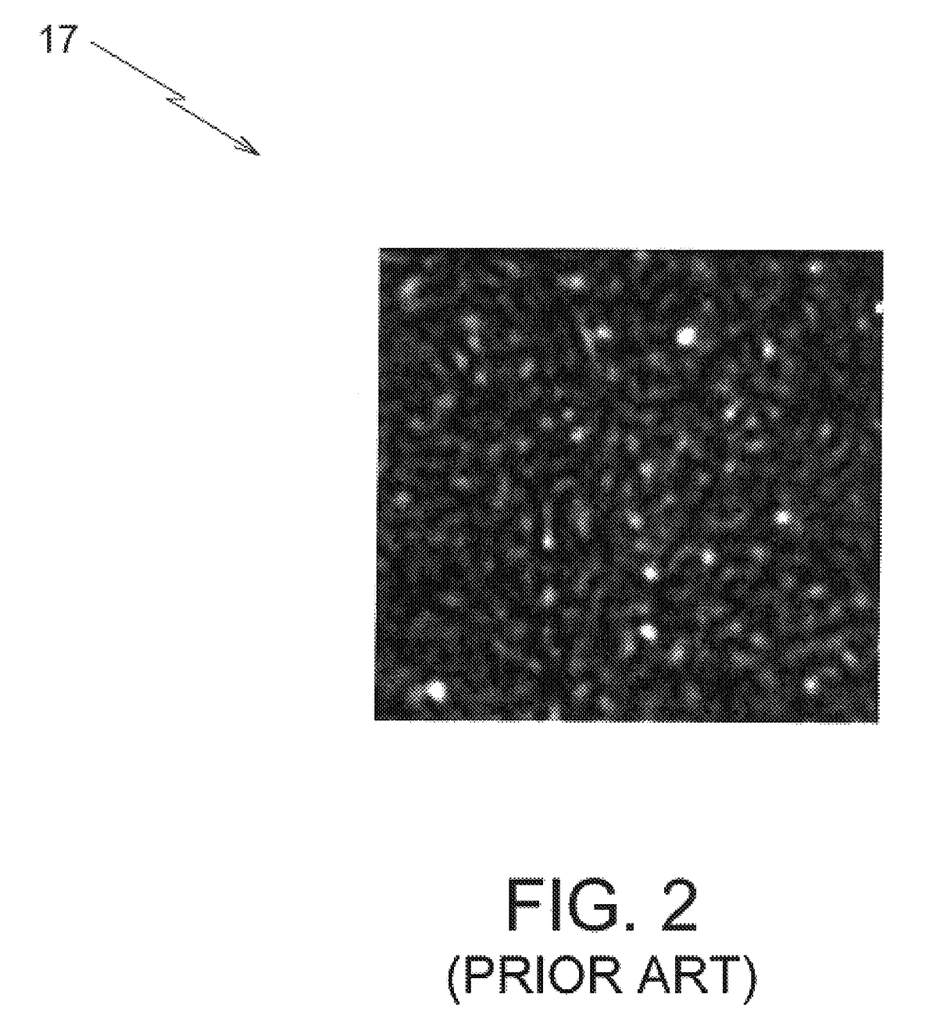
FIG. 2 is a photograph of a typical laser speckle pattern of the prior art.

FIG. 2 is a photograph of a typical speckle pattern 17 of the prior art, which is illustrative of the speckle viewed at the observation plane 16. Constructive interference of the divergent laser beam 12 reflecting diffusely from the viewing screen 6 creates bright spots in the observation plane 16. Destructive interference creates dark spots between the bright spots. The diffuse reflection from the viewing screen 6 has a random nature so the bright spots and the dark spots vary throughout the observation plane 16.

A measure of the speckle is contrast (C). The contrast, in percent, is given by $C=100*I_{RMS}/\bar{I}$ where $\bar{I}$ is a mean intensity and $I_{RMS}$ is a root mean square intensity fluctuation about the mean intensity.

Goodman in "Some fundamental properties of speckle," J. Opt. Soc. A., Vol. 66, No. 11, November 1976, pp 1145–1150, teaches that the speckle can be reduced by superimposing N uncorrelated speckle patterns. This reduces the contrast by a speckle reduction factor of $\sqrt{N}$ provided that the N uncorrelated speckle patterns have equal mean intensities and contrasts. If the N uncorrelated speckle patterns have non-equal mean intensities or non-equal contrasts, the speckle reduction factor will be less than $\sqrt{N}$. Thus, the speckle reduction factor of $\sqrt{N}$ is a best case for the speckle reduction for the N uncorrelated speckle patterns. Goodman further teaches that the uncorrelated speckle patterns can be obtained by means of time, space, frequency, or polarization.

A speckle reduction method of the prior art creates multiple speckle patterns by moving the viewing screen 6 in an oscillatory motion 19, which employs the time means taught by Goodman. The oscillatory motion 19 typically follows a small circle or a small ellipse about the optic axis 8. This causes the speckle pattern to shift relative to the eye or the optical system viewing the viewing screen 6 and, thus, forms multiple speckle patterns over time. Though the amount of the speckle at any instant in time is unchanged, the eye perceives the reduced speckle provided that the speed of the oscillatory motion is above a threshold speed. The intensity detector of the optical system detects the reduced speckle provided that an exposure time is sufficiently long to allow the speckle pattern to move a significant distance.

In the art of laser illuminated display systems, it is known that an active diffuser can be added to a laser illuminated imaging system for reducing laser speckle. The active diffuser is placed in an intermediary image plane or near the intermediary image plane. The active diffuser is moved in the intermediate image plane in a rotation or toroidal pattern about a display system optic axis in order to create a shifting phase at a display screen. The shifting phase creates uncorrelated speckle patterns over time, thus employing the time means, taught by Goodman.

Wang et al. in "Speckle reduction in laser projection systems by diffractive optical elements," Applied Optics, Vol. 37, No. 10, Apr. 1998, pp 1770–1775, teach a method of laser speckle reduction in a laser projection system such as a laser television system. In the laser projection system a laser spot forms an image on a display screen by a raster scan similarly to how an electron beam forms an image in a CRT (cathode ray tube) display. The method taught by Wang et al. is accomplished by expanding a laser beam, placing a diffractive optical element in the expanded laser beam to form multiple beamlets, and then focusing the laser beamlets to form the laser spot on the display screen. The multiple beamlets shift slightly as each pixel is formed on the display screen. This provides a time varying speckle pattern and consequently a speckle reduction. Wang et al. further teach that the diffractive optical element can be rotated to slightly improve the speckle reduction.

Bloom et al. in U.S. Pat. No. 5,982,553 issued on Nov. 9, 1999, incorporated herein by reference, teach a display system including a grating light valve (GLV), red, green, and blue lasers, various lens arrangements, a scanning mirror, a display screen, and electronics. The electronics control the GLV, the lasers, and the scanning mirror to form a two dimensional image on the display screen.

In the display system taught by Bloom et al., the GLV forms a line image composed of a linear array of pixels on the display screen. The scanning mirror repeatedly scans the line image across the display screen in a direction perpendicular to the line image as the GLV modulates the linear array of pixels thereby forming the two dimensional image.

Because the two dimensional image taught by Bloom et al. is formed by laser illumination, the two dimensional image exhibits laser speckle, which degrades an image quality. It would be desirable to improve the image quality by reducing the laser speckle.

What is needed is a method of reducing laser speckle in a display system where a two dimensional image is formed by scanning a line image.

What is needed is a method of reducing laser speckle in an optical system where a line illumination produced by a laser is scanned over a diffuse surface.

SUMMARY OF THE INVENTION

This invention is a method and apparatus for displaying a two dimensional image formed by scanning a line image across a display screen where the two dimensional image exhibits reduced laser speckle. The display apparatus includes a light modulator, a wavefront modulator, and a projection/scanning optical arrangement. The light modulator modulates a laser illumination to form a line image made up of a linear array of pixels. The wavefront modulator varies a spatial phase across a width of the line image thus forming a phase modulated wavefront. The projection/scanning optical arrangement projects the line image onto the display screen and scans the line image across the display screen. The phase modulated wavefront produces multiple speckle patterns as the line image is scanned over the display screen and, thus, produces the reduced laser speckle.

Alternatively, the present invention is appropriate for reducing laser speckle in any laser illuminated system where a line illumination produced by a laser is scanned across a diffuse surface.

DETAILED DESCRIPTION OF THE PREFERRED EMBODIMENT

Figure 3:
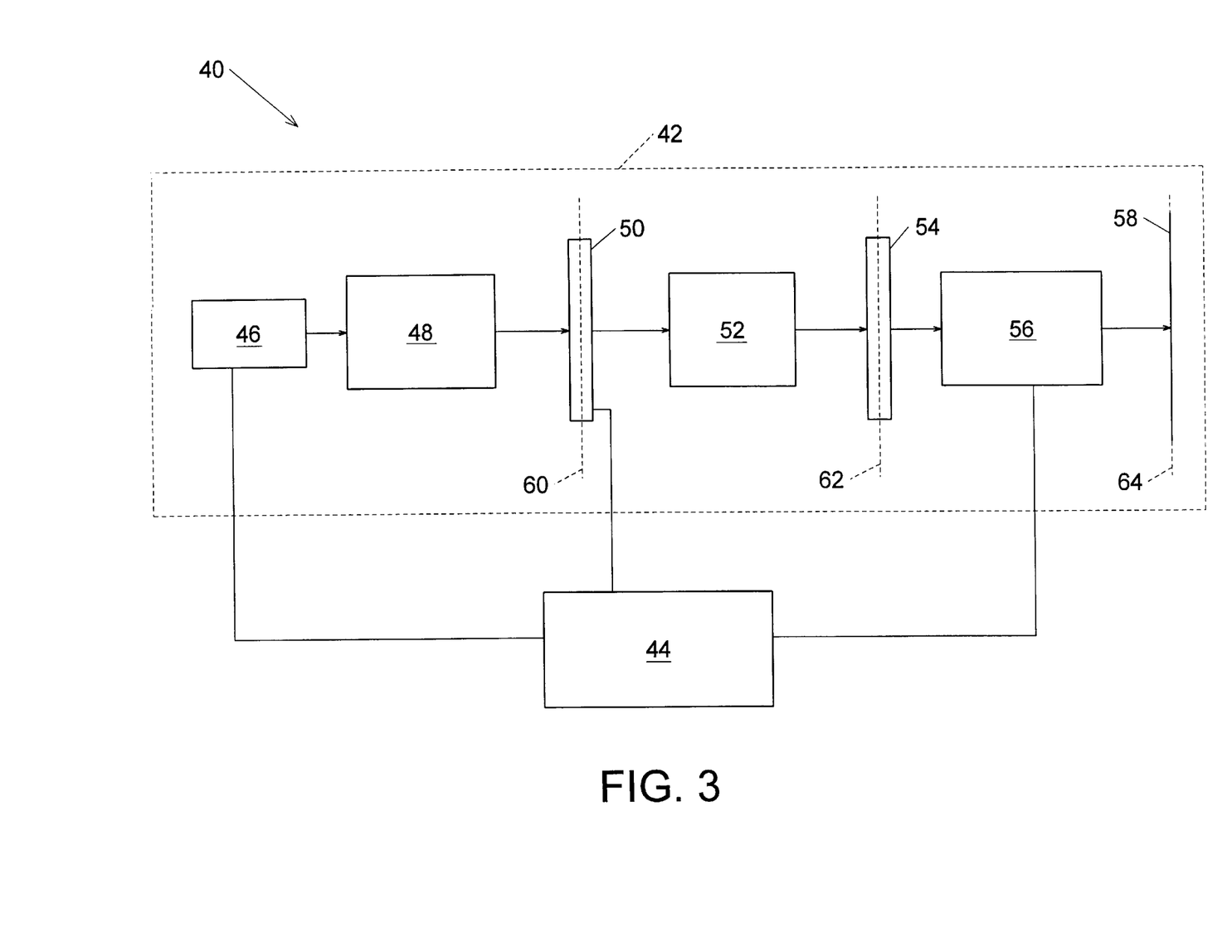
FIG. 3 schematically illustrates a display apparatus of the present invention.

A display system of the present invention is illustrated schematically in FIG. 3. The display system 40 includes display optics 42 and display electronics 44. The display optics 42 comprise a laser 46, illumination optics 48, a grating light valve (GLV) 50, Schlieren optics 52, a wavefront modulator 54, projection and scanning optics 56, and a display screen 58. The display electronics 44 are coupled to the laser source 46, the GLV 50, and the projection and scanning optics 56.

The display electronics 44 power the laser 46. The laser 46 emits a laser illumination. The illumination optics 48 focus the laser illumination onto the GLV 50. The GLV 50 is located in a first image plane 60. The display electronics 44 control the GLV 50. The GLV 50 modulates the laser illumination forming reflected light or diffracted light for a linear array of pixels. The Schlieren optics 52 separates the reflected light from the diffracted light allowing at least plus one and minus one diffraction orders to pass the Schlieren optics 52.

The Schlieren optics forms a line image having a line image width at the wavefront modulator 54. The wavefront modulator 54 is located in a second image plane 62. The wavefront modulator 54 modulates a phase across the line image width. The display electronics 44 drive a scanning mirror of the projection and scanning optics 56. The projection and scanning optics 56 project the line image onto the display screen 58 and scan the line image across the display screen 58 to form a two dimensional image on the display screen 58. The display screen 58 is located in a third image plane 64.

The wavefront modulator 54 varies the phase across the line image width at the display screen 58. As the line image width scans across the display screen 58, the phase varies and, thus, produces multiple speckle patterns over time. A human eye or an intensity detector of an optical system viewing the multiple speckle patterns detects reduced speckle.

Figure 4:
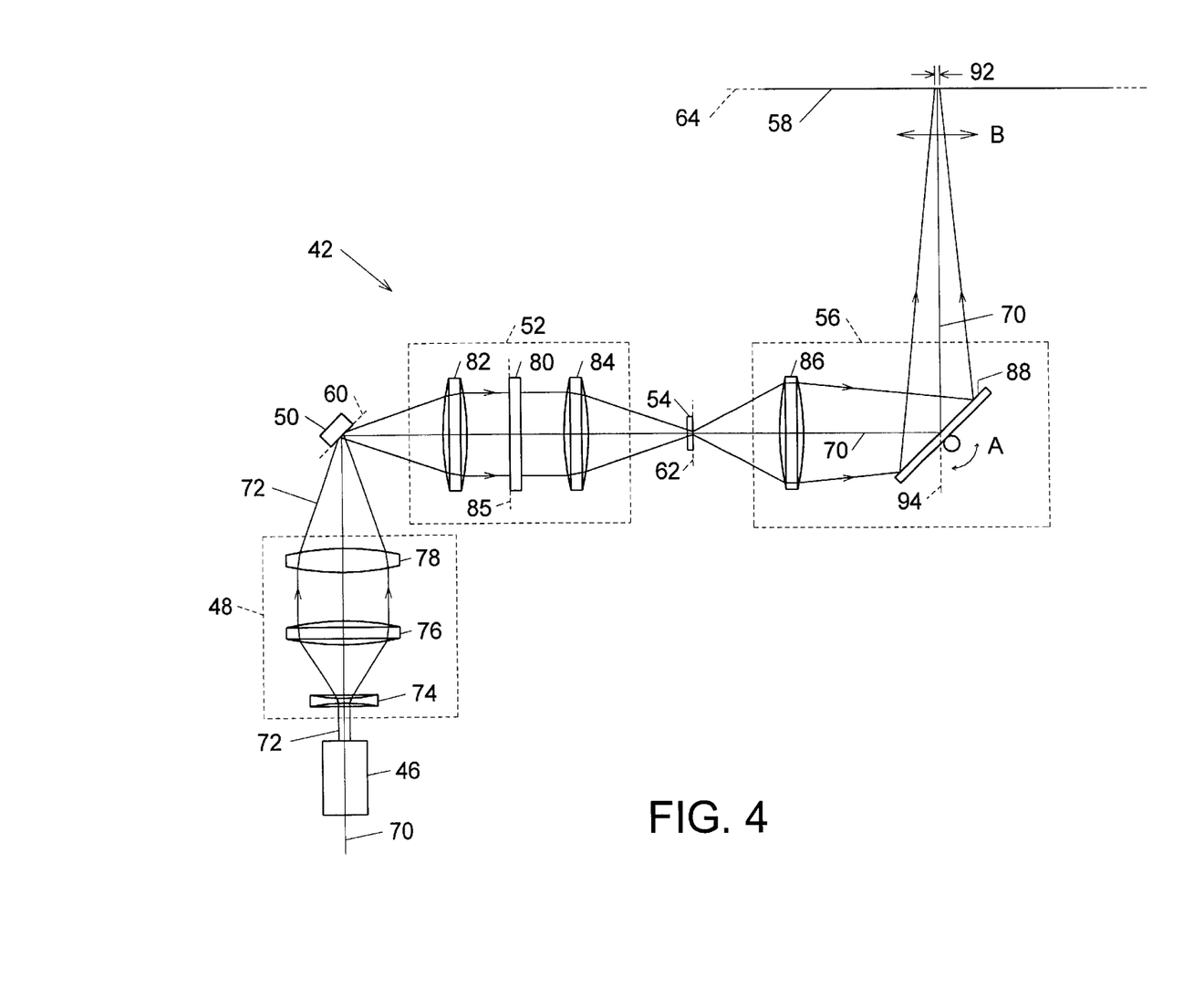
FIG. 4 illustrates a plan view of display optics of the present invention.
Figure 5:
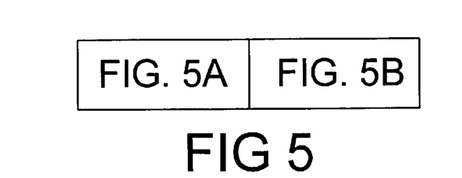
FIG. 5 illustrates an elevation view of the display optics of the present invention with the display optics unfolded along an optic axis.
Figure 5A:
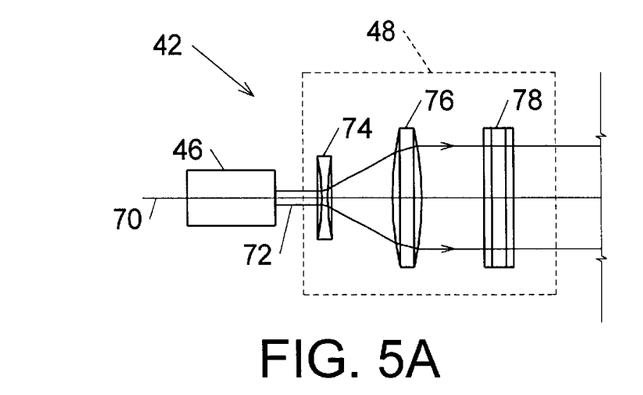
Figure 5B:
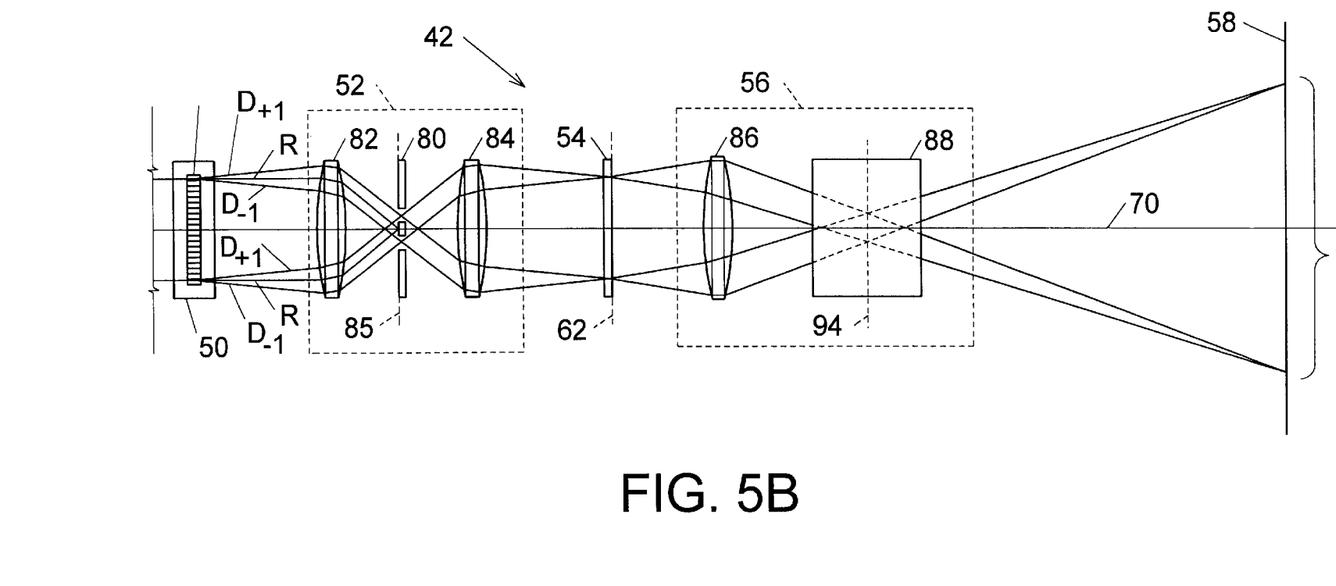

The display optics 42 of the present invention are further illustrated in FIGS. 4 and 5. FIG. 4 illustrates a plan view of the display optics 42. FIG. 5 illustrates an elevation view of the display optics 42, with the display optics 42 unfolded along an optic axis 70. The laser 46 emits the laser illumination 72. The illumination optics comprise a divergent lens 74, a collimation lens 76, and a cylindrical lens 78. The illumination optics 48 focus the laser illumination 72 onto the GLV 50 in a focus line having a focus width. Note that FIG. 4 illustrates the laser illumination 72 illuminating the GLV 50 with an angle of incidence of 45°. Ideally, the angle of incidence is a minimum angle of incidence which allows the laser illumination 72 to illuminate the GLV 50 while allowing the reflected and diffracted light to reach the Schlieren optics 52. It will be readily apparent to one skilled in the art that other optics arrangements can be used to illuminate the GLV 50. It will also be readily apparent to one skilled in the art that depiction of lenses in the present invention is not limited to single component lenses and that any given lens can be replaced with a compound lens or a reflective optical element.

The GLV 50 modulates the laser illumination 72 as the linear array of pixels along the focus line, forming the reflected light R or the diffracted light, including the plus one and minus one diffraction orders, $D_{+1}$ and $D_{-1}$, for each pixel. Preferably, the GLV 50 produces a linear array of 1,080 pixels. Alternatively, the GLV 50 produces more or less than 1,080 pixels. Note that FIG. 5 illustrates the reflected light R and the plus one and minus one diffraction orders, $D_{+1}$ and $D_{-1}$, for two pixels for illustration purposes. If a given pixel is modulated to reflect light, the reflected light R will be present and the plus one and minus one diffraction orders, $D_{+1}$ and $D_{-1}$, will not be present. Alternatively, if the given pixel is modulated to diffract light, the plus one and minus one diffraction orders, $D_{+1}$ and $D_{-1}$, will be present and the reflected light R will not be present. In some instances it is desirable to modulate the given pixel to produce the reflected light R and the plus one and minus one diffraction orders, $D_{+1}$ and $D_{-1}$, in order to reduce a brightness of the given pixel in a resulting image, which provides a gray scale effect in the resulting image.

The Schlieren optics 52 include a Schlieren stop 80 located between first and second relay lenses, 82 and 84. The Schlieren stop 80 stops the reflected light R and allows the plus one and minus one diffraction orders, $D_{+1}$ and $D_{-1}$, to pass the Schlieren stop 80. The Schlieren stop 80 is preferably located in a first transform plane 85. Alternatively, the Schlieren stop 80 is located near the first transform plane 85.

The first and second relay lenses, 82 and 84, image the linear array of pixels as the line image in the second image plane 62, which is preferably within the wavefront modulator 54. Alternatively, the second image plane 62 is near the wavefront modulator 54. Dark and light pixels make up the line image. The dark pixels correspond to the pixels at the GLV 50 which are modulated to provide the reflected light R. The light pixels correspond to the pixels at the GLV 50 which are modulated to provide the diffracted light including the plus one and minus one diffraction orders, $D_{+1}$ and $D_{-1}$.

The wavefront modulator 54 forms a spatial phase variation of a wavefront across the line image width at the wavefront modulator 54. Preferably, the spatial phase variation is between 0 and $2\pi$ radians for the wavelength of the laser illumination 72. Preferably, the spatial phase variation has a period smaller than the line image width at the wavefront modulator 54 but equal or larger than a smallest size resolution of the projection and scanning optics 56. The wavefront modulator 54 preferably comprises a transmissive diffraction grating with a grating profile at least partially orthogonal to the line image. Alternatively, the wavefront modulator 54 comprises a reflective diffraction grating with the grating profile at least partially orthogonal to the line image. It will be readily apparent to one skilled in the art that using the reflective diffraction grating entails rearranging the display optics 42 to account for the reflective diffraction grating. It will also be readily apparent to one skilled in the art that a random profile of varying height can be used in lieu of the grating profile to produce the spatial phase variation of the wavefront across the line image width.

The projection and scanning optics 56 comprise a projection lens 86 and the scanning mirror 88. The projection lens 86, via the scanning mirror 88, projects the line image 90 onto the display screen 58. The projection lens 86 also reforms the wavefront having the spatial phase variation across the line image width 92 on the display screen 58. The scanning mirror 88 is preferably located at about a second transform plane 94.

The scanning mirror 88 moves with a first scan motion A and, thus, scans the line image 90 across the display screen 58 with a second scan motion B. Preferably, the first scan motion A is a saw-tooth scan motion where a first part of a scan cycle illuminates the display screen 58 and a second part of the scan cycle returns the scanning mirror 88 back to a beginning of the scan cycle. By repeatedly scanning the line image 90 across the display screen 58, a two dimensional image is formed on the display screen 58. It will be readily apparent to one skilled in the art that other scan motions can be used to scan the line image 90 across the display screen 58. It will also be readily apparent to one skilled in the art that a transmissive scanning device such as an objective scanner having zero optical power can replace the scanning mirror 88.

As the line image 90 scans across the display screen 58, the GLV 50 modulates the linear array of pixels thus producing the two dimensional image made up of a rectangular array of pixels. For a high definition television (HDTV) format, the GLV 50 modulates 1,920 times as the line image 90 scans across the display screen 58. Thus, the GLV 50 preferably produces a 1,920 by 1,080 rectangular array forming the two dimensional image for the HDTV format. For other picture formats, the GLV 50 modulates more or less than the 1,920 times as the line image 90 scans across the display screen 58 depending upon which of the other picture formats is being displayed.

As the line image width 92 scans across the display screen 58, the wavefront having the spatial phase variation produces the multiple speckle patterns with time. The multiple speckle patterns reduce the speckle that is detected by the eye or the intensity detector of the optical system.

The display optics 42 depicted in FIGS. 3, 4, and 5 produce a monochrome image. Color display optics comprise the display optics 42, two additional lasers, two additional illumination optics, two additional GLV's, and a dichroic filter group. In the color display optics, red, green, and blue lasers illuminate the three GLV's producing red, green, and blue linear arrays of pixels. The dichroic filter group combines the reflected and diffracted light from the three GLV's and directs the reflected and diffracted light to the Schlieren optics 52. The wavefront modulator 54 varies the phase across the line image width 92 for red, green, and blue wavefronts at the wavefront modulator 54 and consequently at the display screen 58. For the color display optics, the spatial phase variation across the line image width 92 preferably has an optimum amplitude for one of red, green, and blue laser illuminations (e.g., the green laser illumination), or a wavelength that is a specific average of participating wavelengths. The red, green, and blue wavefronts produce the multiple speckle patterns over time as the line image 90 is scanned across the display screen 58 and, thus, reduce the speckle in the color display optics. Alternatively, in the color display optics, the dichroic filter group combines the red, green, and blue laser illuminations to sequentially illuminate a single GLV.

Figure 6A:
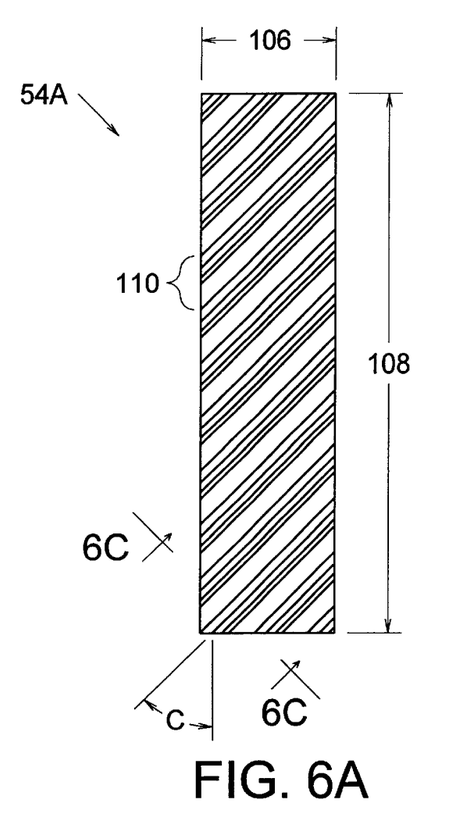
FIGS. 6A, 6B, and 6C illustrate the preferred wavefront modulator of the present invention.
Figure 6B:
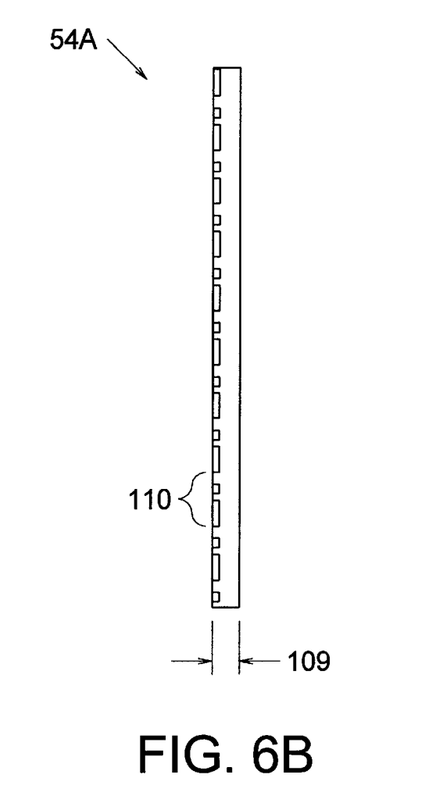

The preferred wavefront modulator 54A is illustrated in FIGS. 6A and 6B. The preferred wavefront modulator 54A comprises a transmissive diffraction grating having a width, height, and thickness, 106, 108, and 109, and a grating profile 110. Preferably, the width 106 is about 4 mm, the height 108 is about 35 mm, and the thickness 109 is about 1 mm in order to provide a convenient handling size and redundancy for a 27.5 mm line image having a 25.5 $\mu$m line image width at the preferred wavefront modulator 54A. Alternatively, the height 108 and the width 106 are selected to be at least a size of the line image and the line image width at the preferred wavefront modulator 54A and the thickness 109 is selected to be at least that which provides sufficient handling structure. Note that for illustrative purposes FIGS. 6A and 6B depict the grating profile 110 as being much larger than actual practice.

The grating profile 110 forms an angle C to the height 108, which is parallel to the 27.5 mm line image. The grating profile 110 is at least partially orthogonal to the 27.5 mm line image at the preferred wavefront modulator 54A so the angle C is not 90°. Preferably, the angle C is about 45° in order to optimize an optical throughput for the projection lens 86 and scanning mirror 88 of the display optics 42 (FIGS. 4 and 5). The 45° angle provides the spatial phase variation across the line image width 92 at the display screen 58 while minimizing an optical footprint at the scanning mirror 88, which is located at about the second transform plane 94 (FIGS. 4 and 5). The grating profile 110, the angle C, the projection lens 86, and the scanning mirror 88 form an interrelated subsystem of the display optics 42 (FIGS. 4, 5, 6A, and 6B). It will be readily apparent to one skilled in the art that the interrelated subsystem can be optimized using a different grating profile, an angle other than 45° for the angle C, a different projection lens, and a different scanning mirror.

Figure 6C:
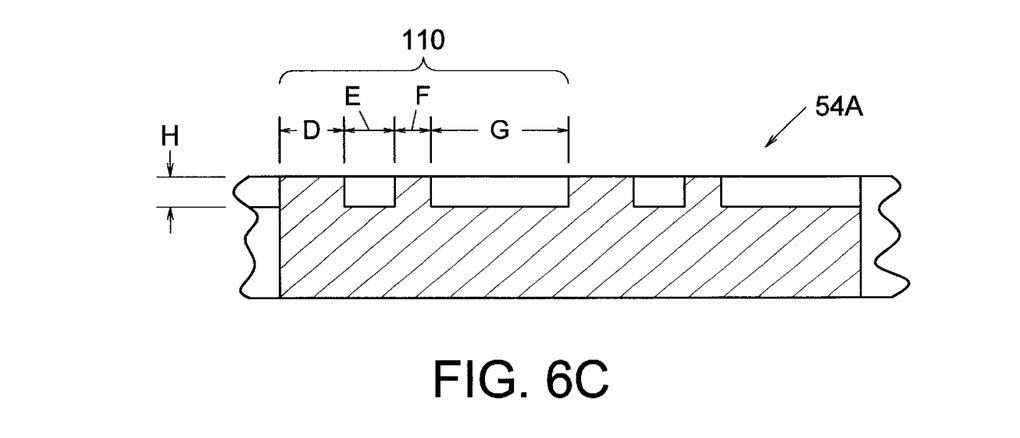

FIG. 6C further illustrates the grating profile 110. The grating profile 110 comprises a two pitch grating profile. The preferred grating profile optimized for a grating material of fused silica (having an index of refraction for 532 nm light of 1.46), for the 25.5 $\mu$m line image width at the preferred wavefront modulator 54A, and for the interrelated subsystem, where the projection lens 86 has an f/2.5 speed, follows:

| FIG. 6C Reference | Dimension |
|---|---|
| D | 4 μm |
| E | 3.5 |
| F | 2 |
| G | 8.5 |
| H | 578 nm |

The dimension H is determined by H=λ/[2(n−1)], where λ is the light wavelength and n is the index of refraction for the grating material. The preferred grating profile optimizes the optical footprint for the interrelated subsystem where the scanning mirror 88 comprises a rectangular mirror located at about the second transform plane 94 of the display optics 42 (FIGS. 4 and 5).

The preferred wavefront modulator 54A is preferably fabricated by etching a photolithographic pattern into the fused silica. Preferably, the preferred wavefront modulator 54A includes an antireflection coating. The preferred antireflection coating is a 400–700 nm BBAR (broadband anti-reflective) coating.

As previously mentioned, as the line image width 92 scans across the display screen 58, the wavefront having the spatial phase variation produces the multiple speckle patterns with time. When detected by the eye, the multiple speckle patterns reduce the speckle by a speckle reduction factor of the present invention.

The speckle reduction factor of the present invention is given by:

$$\text{Speckle reduction factor} = (1+\theta_{proj2}/\theta_{eye})^{1/2}/(1+\theta_{proj1}/\theta_{eye})^{1/2}$$

where $\theta_{proj1}$=first projected planar angle, in scan direction, subtended by projected light, the first projected planar angle is for the display optics 42 without the wavefront modulator 54

$\theta_{proj2}$=second projected planar angle, in scan direction, subtended by projected light, the second projected planar angle is for the display optics 42 with the wavefront modulator 54

$\theta_{eye}$=viewed planar angle subtended by the eye

By including the wavefront modulator 54 in the display optics 42, the first projected planar angle $\theta_{proj1}$ is increased to the second projected planar angle $\theta_{proj2}$. By designing the wavefront modulator 54 to maximize a projection exit pupil of the projection and scanning optics 56, the speckle reduction factor of the present invention is maximized.

While the speckle reduction factor estimates an overall reduction in the speckle of the present invention, it is helpful to understand how the speckle is reduced relative to the line image width 92 as it is scanned across the display screen 58.

As the line image width 92 scans across each pixel on the display screen 58, the multiple speckle patterns are produced because a light wave function $\psi_{total}(x,t)$ varies with time t:

$$\psi_{total}(x,t) = \psi_{screen}(x) + \psi_{beam}(x-vt)$$

where $\psi_{screen}$=a light wave function for a stationary display screen $\psi_{beam}$=a varying light wave function constituting a moving beam x=position on the display screen 58 along scan direction v=scan speed of the line image width 92

Since the scan motion is fast, less than 10 μs to traverse a pixel, the eye averages the multiple speckle patterns.

Figure 7A:
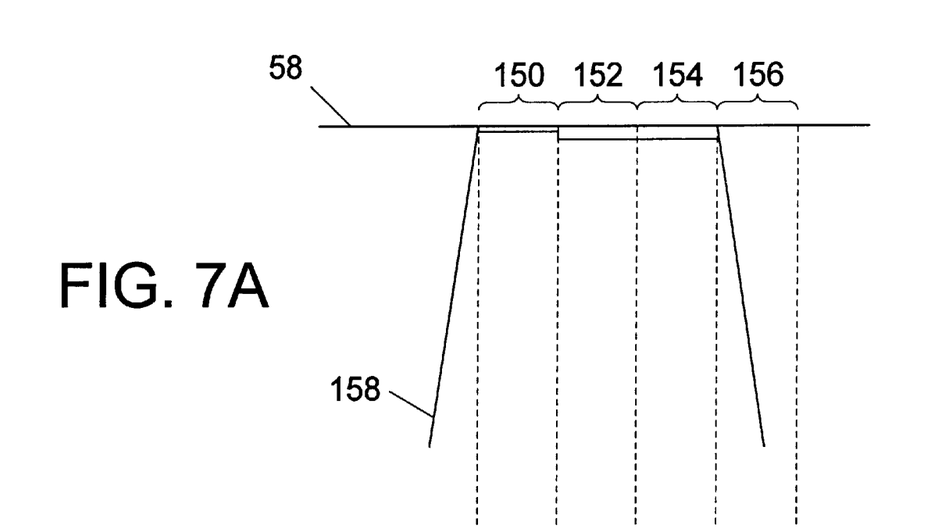
FIGS. 7A and 7B illustrate a progression of wavefronts as a line image is scanned across a display screen of the present invention.
Figure 7B:
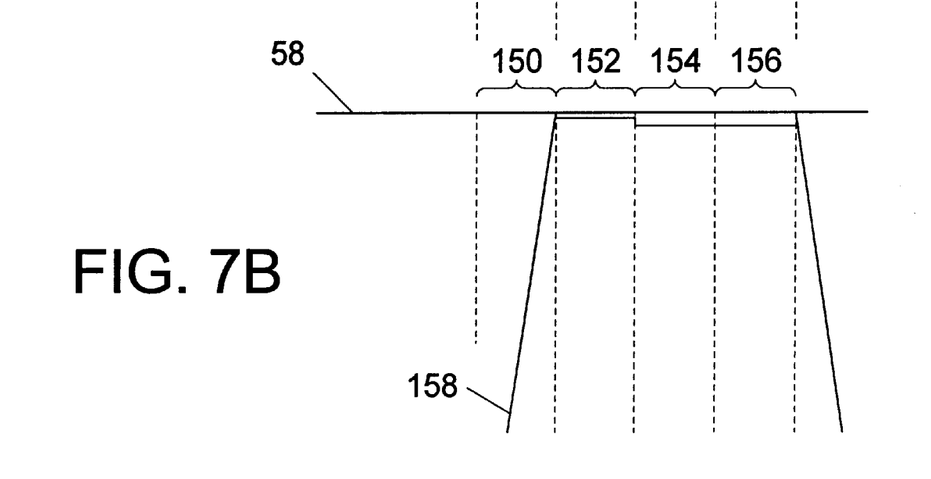

An illustrative example, demonstrating how the multiple speckle patterns are formed by first, second, third, and fourth scattering areas and a two-step wavefront profile, is schematically depicted in FIGS. 7A and 7B. Beginning with FIG. 7A, the first, second, third, and fourth scattering areas, 150, 152, 154, and 156, on display screen 58, are shown at an initial time $t_1$, with the two-step wavefront profile 158 illuminating the first, second, and third scattering areas, 150, 152, and 154 and with the two-step wavefront profile 158 viewed by an observer's eye.

A first light wave function $\psi(t_1)$ describes light viewed by the observer's eye, which is given by:

$$\psi(t_1) = A_1 e^{i\phi'} + A_2 e^{i\phi''} + A_3 e^{i\phi'''}$$

where $A_1$=first amplitude of light diffusely reflecting from the first scattering area 150

$A_2$=second amplitude of light diffusely reflecting from the second scattering area 152

$A_3$=third amplitude of light diffusely reflecting from the third scattering area 154

$\phi'$=first phase of light diffusely reflecting from the first scattering area 150

$\phi''$=second phase of light diffusely reflecting from the second scattering area 152

$\phi'''$=third phase of light diffusely reflecting from the third scattering area 154

For the illustrative example, it is assumed that $\phi'=\pi$ radians and $\phi''=\phi'''=0$. Thus, the light wave function $\psi(t_1)$ is given by:

$$\psi(t_1) = -A_1 + A_2 + A_3$$

This leads to intensity a first intensity $I(t_1)$ for the first light wave function $\psi(t_1)$ as follows:

$$I(t_1) = \psi(t_1)^2 = A_1^2 + A_2^2 + A_3^2 - 2A_1A_2 - 2A_1A_3 + 2A_2A_3$$

FIG. 7B schematically depicts the two-step wavefront profile 158 on the display screen 58 at a later time $t_2$ where the two-step wavefront profile 158 illuminates the second, third, and fourth scattering areas, 152, 154, and 156.

A second light wave function $\psi(t_2)$ describes light viewed by the observer's eye, which is given by:

$$\psi(t_2) = A_2 e^{i\phi''} + A_3 e^{i\phi'''} + A_4 e^{i\phi''''}$$

where $A_4$=third amplitude of light diffusely reflecting from the third scattering area 156

$\phi''''$=fourth phase of light diffusely reflecting from the fourth scattering area 156

For the illustrative example, it is assumed that $\phi''=\pi$ radians and $\phi'''=\phi''''=0$. Thus, the light wave function $\psi(t_2)$ is given by:

$$\psi(t_2) = -A_2 + A_3 + A_4$$

This leads to a second intensity $I(t_2)$ for the second light wave function $\psi(t_2)$ as follows:

$$I(t_2) = \psi(t_2)^2 = A_2^2 + A_3^2 + A_4^2 - 2A_2A_3 - 2A_2A_4 + 2A_3A_4$$

Since a time difference between the initial time $t_1$ and the later time $t_2$ is much less than an integration time for the observer's eye, the observer's eye averages the first and second intensities, $I(t_1)$ and $I(t_2)$. In particular, comparison of the first and second intensities, $I(t_1)$ and $I(t_2)$, shows that a first cross term (+2A$_2$A$_3$) in the first intensity I(t$_1$) is cancelled by a second cross term (−2A$_2$A$_3$) in the second intensity I(t$_2$). It is this cancelling of cross terms that reduces the speckle viewed by the observer's eye.

First alternative display optics of the present invention utilize a linear array of reflective light valves. Referring to FIGS. 4 and 5, such a system would replace the GLV 50 with the linear array of the reflective light valves and would not use the Schlieren stop 80. In the first alternative display optics, a particular reflective light valve produces the dark pixel by reflecting the laser illumination away from the first relay lens 82. In the first alternative display optics, the particular reflective light valve produces the light pixel by reflecting the laser illumination to the first relay lens 82.

Second alternative display optics of the present invention utilize a linear array of transmissive light valves. Referring to FIGS. 4 and 5, such a system would replace the GLV 50 with the linear array of the transmissive light valves and would not use the Schlieren stop 80. In the second alternative display optics, a particular transmissive light valve produces the dark pixel by not transmitting the laser illumination to the first relay lens 82. In the second alternative display optics, the particular reflective light valve produces the light pixel by transmitting the laser illumination to the first relay lens 82.

Third alternative display optics of the present invention replace the Schlieren optics with a reflective Schlieren optics. The reflective Schlieren optics preferably utilize an Offner relay. The Offner relay includes a concave mirror and a convex mirror. The convex mirror includes a rectangular slit. The reflected light R and the diffracted light, including the plus one and minus one diffraction orders, D$_{+1}$ and D$_{-1}$, reflect from the concave mirror to the convex mirror. The reflected light R passes through the rectangular slit. The plus one and minus one diffraction orders, D$_{+1}$ and D$_{-1}$, reflect from the convex mirror back to the concave mirror. Subsequently, the concave mirror reflects the plus one and minus one diffraction orders, D$_{+1}$ and D$_{-1}$, to the wavefront modulator 54.

Figure 8:
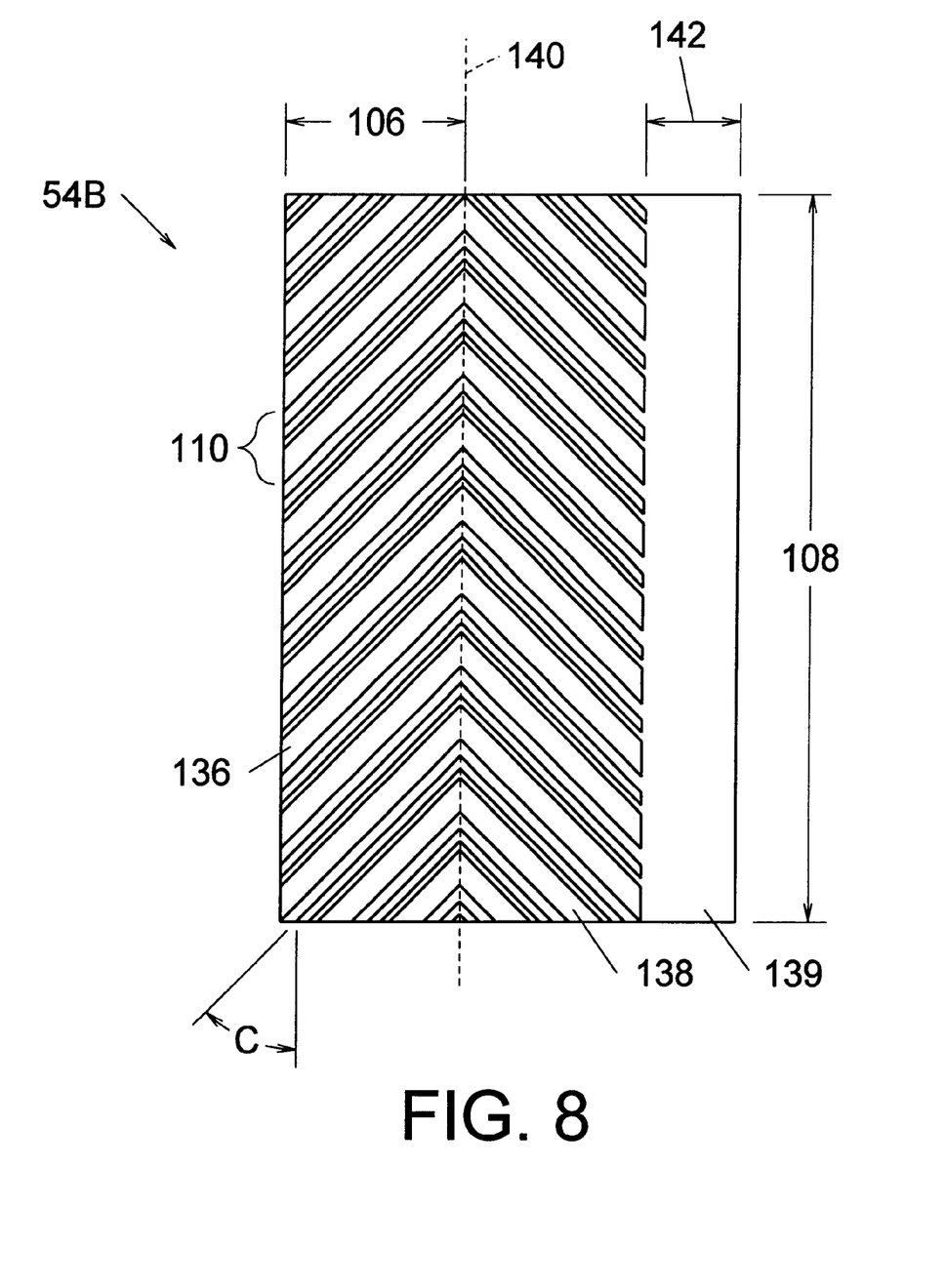
FIG. 8 illustrates an alternative wavefront modulator of the present invention.

An alternative wavefront modulator is illustrated in FIG. 8. The alternative wavefront modulator 54B comprises first and second grating surfaces, 136 and 138, and a tuning surface 139. The second grating surface 138 comprises the first grating surface mirrored across a line 140. The tuning surface 139 comprises a flat surface used for an initial alignment of the display optics 42 (FIGS. 4, 5, and 8). In the initial alignment of the display optics 42, the line image 90 is focused in or near the tuning surface 139 in order to tune the display optics 42 to account for an optical thickness of the alternative wavefront modulator 54B. After the initial alignment, either the first or second grating surface, 136 or 138, is selected to produce the spatial phase variation across the wavefront. In this way an optical flaw in subsequent optics can be minimized by selecting the first or second grating surface, 136 or 138, whichever provides a better image quality (FIGS. 4, 5, and 8).

Two tests were performed to evaluate performance of the preferred wavefront modulator 54A having the preferred grating profile. In the first test, no wavefront modulator was present. In the first test, the contrast was found to be 44%. In the second test the preferred wavefront modulator 54A was present. In the second test, the contrast was found to be 20%. Thus, a 2.2 speckle reduction factor ($\sqrt{N}$) was produced by the preferred wavefront modulator 54A.

While the present invention has been described with respect to the display system 40 of the present invention, the present invention is appropriate for reducing laser speckle in any laser illuminated system where a line illumination produced by a laser is scanned across a diffuse surface.

It will be readily apparent to one skilled in the art that other various modifications may be made to the preferred embodiment without departing from the spirit and scope of the invention as defined by the appended claims.

I claim:

1. A display apparatus for displaying a two dimensional image on a display screen comprising:
   a. a light modulator located in a first image plane, driven by electronic means, and illuminated by a laser illumination, the light modulator forming a linear array of pixels, the linear array of pixels forming a line image;
   b. a wavefront modulator located in a second image plane, the wavefront modulator spatially varying a phase across a width of the line image whereby a phase modulated wavefront is formed; and
   c. a projection/scanning optical arrangement driven by the electronic means, projecting the line image onto the display screen, and scanning the line image over the display screen such that a two dimensional image is formed on the display screen and further such that the phase modulated wavefront reduces laser speckle.

2. The display apparatus of claim 1 wherein the light modulator comprises a diffractive light valve array.

3. The display apparatus of claim 2 wherein the diffractive light valve array comprises a grating light valve.

4. The display apparatus of claim 3 wherein the second image plane is optically located between the first image plane and the projection/scanning optical arrangement.

5. The display apparatus of claim 1 wherein the light modulator comprises a reflective light valve array.

6. The display apparatus of claim 1 wherein the light modulator comprises a transmissive light valve array.

7. The display apparatus of claim 1 wherein the wavefront modulator comprises a diffractive element.

8. The display apparatus of claim 1 wherein the wavefront modulator comprises a reflective clement.

9. The display apparatus of claim 1 wherein the wavefront modulator comprises a diffraction grating.

10. The display apparatus of claim 9 wherein the diffraction grating comprises a two pitch diffraction grating.

11. The display apparatus of claim 9 wherein the projection/scanning optical arrangement comprises a projection lens and a scanning mirror and further wherein the projection lens, the scanning mirror, and the diffraction grating are configured to optimize an optical throughput.

12. A display apparatus for displaying a two dimensional image on a display screen comprising:
   a. a laser source controlled by electronic means and providing a laser output;
   b. a first optical arrangement cylindrically focusing the laser output in a focus line, the focus line having a focus width, the focus line located at a first image plane;
   c. a light valve array modulated by the electronic means, located in the first image plane, and configured to produce a linear array of pixels, the linear array of pixels forming a line image;
   d. a second optical arrangement for cylindrically focusing the focus line having the focus width in a second image plane;
   e. a wavefront modulator located in the second image plane and modulating a spatial phase across the focus width such that a phase modulated wavefront is formed across a line image width; and f. a third optical arrangement driven by the electronic means, the third optical arrangement projecting the line image onto the display screen and scanning the line image over the display screen such that the two dimensional image is formed on the display screen and further such that the phase modulated wavefront reduces laser speckle.

13. The display apparatus of claim 12 wherein the light valve array comprises a diffractive light valve array.

14. The display apparatus of claim 13 wherein the diffractive light valve array comprises a grating light valve and further wherein the third optical arrangement includes means for separating a diffracted portion from a combination of diffracted light and reflected light, the diffracted portion being a part of the diffracted light.

15. The display apparatus of claim 14 wherein the diffracted portion comprises a plus one diffraction order and a minus one diffraction order.

16. The display apparatus of claim 15 wherein the diffracted light forms the line image.

17. The display apparatus of claim 12 wherein the light valve array comprises a reflective light valve array.

18. The display apparatus of claim 12 wherein the light valve array comprises a transmissive light valve array.

19. A display apparatus for displaying a two dimensional image on a display screen comprising:
   a. a laser source controlled by electronic means and providing a laser output;
   b. a first optical arrangement cylindrically focusing the laser output in a focus line, the focus line having a focus width, the focus line located in a first image plane;
   c. a grating light valve located in the first image plane, illuminated by the focus line, and modulated by the electronic means, the grating light valve producing a combination of diffracted light and reflected light arranged in a linear array of pixels, a diffracted portion of the linear array of pixels forming a line image;
   d. a second optical arrangement separating the diffracted portion from the combination of the diffracted light and the reflected light, the second optical arrangement imaging the line image in a second image plane;
   e. a wavefront modulator located in the second image plane and modulating a spatial phase across a line image width whereby a phase modulated line image is formed;
   f. a projection lens projecting the phase modulated line image whereby a projected line image is formed; and
   g. a scanning mirror assembly driven by the electronic means and scanning the projected line image over the display screen such that the two dimensional image is formed on the display screen and further such that the phase modulated line image reduces laser speckle.

20. A method of reducing laser speckle in a laser illuminated display system comprising the steps of:
   a. focusing a laser output in a line having a width;
   b. modulating the laser output along the line to produce a linear array of pixels, the linear array of pixels forming a line image having a line image width;
   c. modulating a spatial phase across the line image width such that a phase modulated wavefront is produced;
   d. projecting the line image onto a display screen; and
   e. scanning the line image over the display screen repeatedly such that a two-dimensional image is formed on the display screen and further such that the phase modulated wavefront reduces the laser speckle.

21. An apparatus for illuminating an area on a diffuse surface comprising:
   a. a wavefront modulator illuminated by a laser illumination and located in a first image plane, the laser illumination forming a line illumination having a line illumination width at the wavefront modulator, the wavefront modulator spatially varying a phase across the line illumination width whereby a phase modulated wavefront is formed; and
   b. a projection/scanning optical arrangement driven by electronic means, projecting the line illumination onto the diffuse surface, and scanning the line illumination over the diffuse surface such that the area is illuminated and further such that the phase modulated wavefront reduces laser speckle.

22. A method of reducing laser speckle comprising the steps of:
   a. focusing a laser output in a line illumination having a line illumination width;
   b. modulating a spatial phase across the line illumination width such that a phase modulated wavefront is produced;
   c. projecting the line illumination onto a diffuse surface; and
   d. scanning the line illumination over the diffuse surface such that an area is illuminated and further such that the phase modulated wavefront reduces laser speckle.

* * * * *